US006271650B1

United States Patent
Massie et al.

(10) Patent No.: US 6,271,650 B1
(45) Date of Patent: Aug. 7, 2001

(54) METHOD AND APPARATUS TO PROVIDE A DC-DC CONVERTER WITH RIPPLE REGULATION AND MULTIPHASE CURRENT SHARING

(75) Inventors: Harold L. Massie, Turnwater; Edward L. Payton, Olympia, both of WA (US)

(73) Assignee: Intel Corporation, Sana Clara, CA (US)

( * ) Notice: Subject to any disclaimer, the term of this patent is extended or adjusted under 35 U.S.C. 154(b) by 0 days.

(21) Appl. No.: 09/548,480

(22) Filed: Apr. 13, 2000

(51) Int. Cl.[7] .................................................. G05F 1/40
(52) U.S. Cl. ............................ 323/272; 323/283
(58) Field of Search .................................. 327/409, 410, 327/112; 323/272, 268, 283

(56) References Cited

U.S. PATENT DOCUMENTS

| | | | |
|---|---|---|---|
| 3,978,393 | * 8/1976 | Wisner et al. | 323/272 |
| 5,534,771 | 7/1996 | Massie . | |
| 5,587,650 | 12/1996 | Massie . | |
| 5,856,740 | * 1/1999 | Rau et al. | 323/272 |
| 5,973,485 | * 10/1999 | Kates et al. | 323/272 |

* cited by examiner

Primary Examiner—Shawn Riley
(74) Attorney, Agent, or Firm—Blakely, Sokoloff, Taylor & Zafman LLP

(57) ABSTRACT

A power supply including a DC—DC converter with multiphase current sharing and ripple regulation. In one embodiment, the disclosed power supply includes a plurality of power drivers coupled to supply power to the supply output. The power drivers are cyclically enabled to provide multiphase current sharing. Ripple regulation is provided with a hysteretic comparator that is coupled to receive feedback from the power supply output. The hysteretic comparator is used to clock or advance a select circuit, which is used to cyclically enable each one of the plurality of power drivers. A reset circuit is included to reset the hysteretic comparator in the event that the hysteretic comparator has not switched for an excessive amount of time. A supply current sensor is used to monitor the current drawn by the plurality of power drivers. As the amount of current drawn by any of the plurality of power drivers rises, the on cycle time of the power driver that is delivering power to the power supply output at that particular time is shortened, enabling the next power driver to deliver power.

30 Claims, 5 Drawing Sheets

METHOD AND APPARATUS TO PROVIDE A DC-DC CONVERTER WITH RIPPLE REGULATION AND MULTIPHASE CURRENT SHARING

BACKGROUND OF THE INVENTION

1. Field of the Invention

The present invention relates generally to power supplies and, more specifically, the present invention relates DC—DC converters.

2. Background Information

In many situations, it is advantageous to combine two or more smaller power supplies together for driving a load instead of providing a single higher powered power supply. In some cases, a plurality of smaller power supplies may be less expensive than a single larger power supply. In other situations, it is advantageous to distribute power among several power supplies rather than centralize power in a single power supply.

When multiple power supplies are shared, the load is ideally shared approximately equally between each power supply. Roughly equal load sharing assures that one power supply is not over-driven as a result of the inability of another power supply to equally share the load. However, in some situations, such as for example when there are transients on the load, the multiple power supplies are not shared equally in known power supplies. Power supply designers are aware of this problem and consequently design known power supplies to be able to accommodate more than their equal share of the load. As a result, these known power supplies are inefficient since the multiple power supplies are designed to be able to supply more power than required if all of the shared power supplies shared the load equally. Another problem with known shared power supplies is that these power supplies have relatively slow response times to transients on the load. As a result, these known power supplies also suffer from imprecise power output.

BRIEF DESCRIPTION OF THE DRAWINGS

The present invention is illustrated by way of example and not limitation in the accompanying figures.

DETAILED DESCRIPTION

Methods and apparatuses for providing a power supply having multiphase current sharing and ripple regulation are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one embodiment of the present invention, a power supply including a direct current (DC)—DC converter with multiphase current sharing and ripple regulation is disclosed. In one embodiment, the ripple regulator of the present invention provides a DC—DC converter with fast response times to transients in the load including high repetition rate transients. In one embodiment, current sharing is provided by the present invention with a plurality of power drivers that are coupled to supply power to the power supply output. In one embodiment, the plurality of power drivers are cyclically enabled in multiple phases. Equal current sharing or distribution is provided in one embodiment among the multiple phases. For instance, in one embodiment, a select circuit cycles through enabling each one of the power drivers in sequence such that each power driver is driven for only a portion of a cycle. In one embodiment, the remaining power drivers in the power supply that are not enabled by the select circuit continue to supply current through the stored energy in their respective energy transfer elements, such as for example inductors or the like.

In one embodiment, the amount of current that is supplied to the plurality of power drivers is monitored by the present invention with a supply current sensor. By monitoring the current supplied to the plurality of power drivers, one embodiment of the present invention is able to reduce the possibility of any particular power driver supplying more than its equal share of the load. In particular, in one embodiment, as the sensed supply current rises, the on cycle time of the power driver that is being driven is shortened for that phase, which enables the next power driver to be driven. Therefore, no power driver is caused to supply more power than its equal share in accordance with teachings of present invention.

Figure 1:
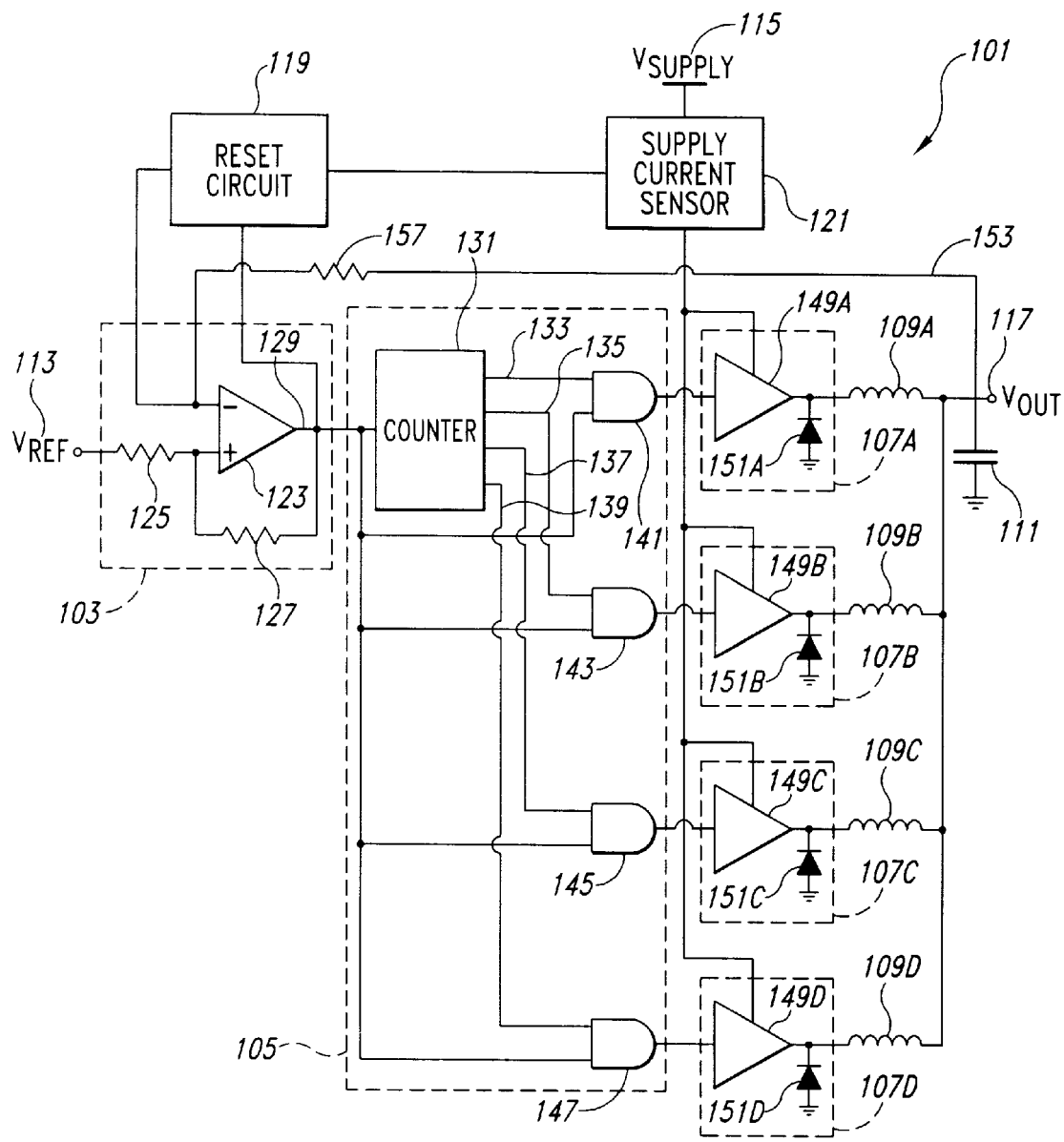
FIG. 1 is a block diagram illustrating one embodiment of a power supply in accordance with the teachings of the present invention.

To illustrate, FIG. 1 is a block diagram of one embodiment of a power supply 101 including a four phase ripple regulator DC—DC converter with multiphase current sharing in accordance with the teachings of the present invention. For explanation purposes, the present invention is illustrated with four phases in the provided illustration. It is appreciated that other embodiment of the present invention may include a greater or a fewer number of phases in accordance with the teachings of the present invention.

As shown in the embodiment of FIG. 1, power supply 101 includes a plurality of power drivers 107A, 107B, 107C and 107D coupled to supply power to power supply output 117 to supply output voltage $V_{OUT}$. In one embodiment, each of the power drivers 107A, 107B, 107C and 107D include a driver and a rectifying element. For instance, power driver 107A includes driver 149A coupled to receive power through supply current sensor 121 from supply voltage $V_{SUPPLY}$ 115. As will be discussed, supply current sensor 121 in one embodiment monitors the current that is supplied to the power drivers 107A, 107B, 107C and 107D.

In one embodiment, power driver 107A also includes a rectifying element 151A coupled to the output of driver 149A. In one embodiment, rectifying element 151A does not conduct when driver 149A is enabled and rectifying element 151A conducts when driver 149A is disabled. In one embodiment, rectifying element 151A is a diode. In another embodiment, rectifying element 151A may be a transistor or the like. As illustrated in FIG. 1, power drivers 107B, 107C and 107D have similar configurations. As will be discussed, power drivers 107A, 107B, 107C and 107D in one embodiment are cyclically enabled in multiple phases with select circuit 105.

In one embodiment, each of the power drivers 107A, 107B, 107C and 107D are coupled to supply power to power supply output 117 through energy transfer elements 109A, 109B, 109C and 109D, respectively. In one embodiment, energy transfer elements 109A, 109B, 109C and 109D are inductors, thereby providing power supply 101 with a plurality of non-isolated buck converters. In other embodiments, energy transfer elements 109A, 109B, 109C and 109D include transformers, coupled inductors or the like. In one embodiment, a filter element 111 is coupled to power supply output 117 to filter the power supply output 117. In one embodiment, filter element 111 includes a capacitor or the like.

As illustrated in FIG. 1, power supply 101 also includes a select circuit 105, which is coupled to selectively enable each one of the plurality of power drivers 107A, 107B, 107C and 107D. In one embodiment, select circuit 105 includes a counter 131 having a plurality of outputs 133, 135, 137 and 139, each of which corresponds to one of the plurality of power drivers 107A, 107B, 107C and 107D. As will be discussed, counter 131 is coupled to receive a signal 129 from hysteretic comparator 103, which in one embodiment cyclically enables outputs 133, 135, 137 and 139 in sequence. In one embodiment, only one of the outputs 133, 135, 137 and 139 are active or high, at a time. That is, when output 133 is active, outputs 135, 137 and 139 are inactive. For explanation purposes, it is appreciated that an active signal in this disclosure is a "high" signal. However, in other embodiments, an active signal may be a "low" signal in accordance with the teachings of the present invention. After a cycle on signal 129 is received by counter 131, counter 131 is advanced, output 135 is then active and outputs 133, 137 and 139 are inactive. In one embodiment, each output 133, 135, 137 and 139 is enabled in sequence by counter 131 and the cycle is repeated after all of the outputs have been enabled. In another embodiment, it is appreciated however that counter 131 may be configured such that more than one of the outputs 133, 135, 137 and 139 may be active at a time under certain circumstances.

In one embodiment, select circuit 105 also includes a plurality of AND gates 141, 143, 145 and 147, each of which corresponds to one of the plurality of power drivers 107A, 107B, 107C and 107D. In the embodiment depicted in FIG. 1, each one of the AND gates 141, 143, 145 and 147 has two inputs. One of these inputs on each respective AND gate 141, 143, 145 or 147 is coupled to receive signal 129. The other one of these inputs on each respective AND gate 141, 143, 145 or 147 is coupled to a corresponding one of outputs 133, 135, 137 or 139, respectively.

As illustrated in the embodiment of FIG. 1, each respective output of AND gate 141, 143, 145 or 147 is used to enable a corresponding one of power drivers 107A, 107B, 107C or 107D. In one embodiment, it is appreciated that in order for any particular power driver to be enabled, both signal 129 as well as the corresponding output from counter 131 are active. For instance, in one embodiment, in order for power driver 107A to be enabled, both output 133 from counter 131 as well as signal 129 are active.

As mentioned earlier, one embodiment of power supply 101 includes ripple regulation to help provide fast response to transients on the load. In one embodiment, ripple regulation is provided with hysteretic comparator 103, which generates signal 129. As shown in the embodiment depicted, hysteretic comparator 103 includes a comparator 123 having an input coupled to a reference voltage $V_{REF}$ 113 through resistor 125. In one embodiment, resistor 127 is coupled between an output of comparator 123 and the input of comparator 123 that is coupled to $V_{REF}$ 113. In one embodiment, the other input of comparator 123 is coupled to receive feedback 153 from power supply output 117 through a resistor 157.

In one embodiment, it is appreciated that resistors 125 and 127 provide hysteresis for comparator 123. For example, assume that signal 129 is inactive, or low. Thus, the voltage received at the input of comparator 123 coupled to $V_{REF}$ 113 is reduced through resistor 127. Conversely, assume that signal 129 is active. In this case, the voltage received at the input of comparator 123 coupled to $V_{REF}$ 113 is increased through resistor 127. As a result, a lower threshold voltage is used by comparator 123 when monitoring feedback 153 to switch signal 129 from an inactive signal to an active signal. In addition, a higher threshold voltage is used by comparator 123 when monitoring feedback 153 to switch signal 129 from an active signal to an inactive signal.

In one embodiment, ripple regulation is by hysteretic comparator 103 as power supply output 117 is regulated to ripple between the lower and upper thresholds determined by $V_{REF}$ 113 and resistors 125 and 127. In one embodiment, each successive ripple at power supply output 117 is provided by one of the power drivers in successive fashion in accordance with the teachings of the present invention. It is appreciated that since there is relatively little or no capacitance in feedback 153, a relatively fast response is provided to transients on a load coupled to power supply output 117 in accordance with the teachings of the present invention.

Figure 2:
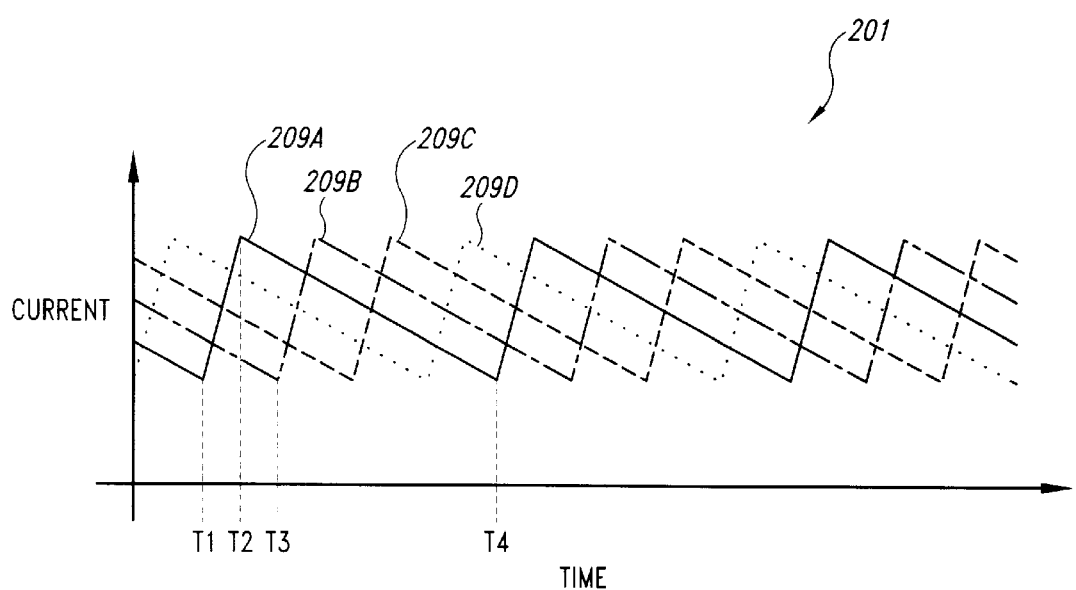
FIG. 2 is a timing diagram of one embodiment of the current flowing through the multiple energy transfer elements of a power supply in accordance with the teachings of the present invention.

In operation, hysteretic comparator 103 clocks or advances counter 131 through signal 129. In one embodiment, each falling edge of signal 129 advances counter 131. To illustrate, FIG. 2 is a timing diagram 201 illustrating the multiple phases of currents 209A, 209B, 209C and 209D flowing through energy transfer elements 109A, 109B, 109C and 109D, respectively, due to the cyclical and/or successive enabling of each one of the power drivers 107A, 107B, 107C and 107D in accordance with teachings of one embodiment of the present invention. At time T1, assume that power driver 107A has been enabled by select circuit 105. Therefore, output 133 and signal 129 are both active at time T1. FIG. 2 shows that current 209A flowing through energy transfer element 109A begins to ramp up at time T1.

At time T2, hysteretic comparator 103 detects through the feedback 153 that the voltage at power supply output 117 has reached the upper threshold level as determined by $V_{REF}$ 113 and resistors 125 and 127. Accordingly, signal 129 switches from active to inactive. This falling edge of signal 129 advances counter 131. Thus, output 135 is now activated. However, since signal 129 is not yet activated, power driver 107B is inactive at this time. Accordingly, the voltage at power supply output 117 begins to ripple down and the current 209A through energy transfer element 109A begins to ramp down at time T2 with the stored energy in energy transfer element 109A. After the voltage at power supply 117 has fallen to the lower threshold voltage, signal 129 of hysteretic comparator 103 switches from being inactive to active. As a result, both output 135 and signal 129 are now active, and power driver 107B is therefore enabled. This corresponds to time T3 in FIG. 2, which shows that current 209B through energy transfer element 109B begins to ramp up.

It is noted that while current begins to ramp up in any one of the energy transfer elements of the present invention, current continues to flow through the other energy transfer elements due to the stored energy in the energy transfer elements, even though the corresponding power driver is disabled. Indeed, FIG. 2 shows that current 209A continues to ramp down until time T4, which is when power driver 107A is enabled again by select circuit 105. Prior to this time, FIG. 2 shows that power drivers 107C and 107D have been enabled and disabled, as shown by currents 209C and 209D, respectively.

Referring back to FIG. 1, power supply 101 includes a reset circuit 119 coupled to receive signal 129 from the output of comparator 123. In addition, reset circuit 119 in one embodiment generates an output coupled to be received by the input of comparator 123 that is also coupled to receive feedback 153. In one embodiment, reset circuit 119 includes a voltage controlled resetable one shot circuit. In one embodiment, reset circuit 119 is coupled to reset comparator 123, or force comparator 123 to switch, in the event that comparator 123 has not switched for an excessive amount of time. Thus, if for some reason the voltage at power supply output 117 does not reach a threshold voltage of hysteretic comparator 103, as determined by $V_{REF}$ 113 and resistors 125 and 127, within a time duration, reset circuit 119 will force comparator 123 to switch. As a result, all of the power drivers 107A, 107B, 107C and 107D continue to be cyclically enabled by select circuit 105 even if hysteretic comparator 103 does not detect that feedback 153 rises to the threshold voltage.

In the embodiment depicted in FIG. 1, supply current sensor 121 is coupled to monitor the current supplied to all of the power drivers 107A, 107B, 107C and 107D. In one embodiment, as the current supplied to power drivers 107A, 107B, 107C and 107D rises, supply current sensor 121 is coupled to cause reset circuit 119 to force comparator 123 to switch sooner. As a result, if any one of the power drivers 107A, 107B, 107C and 107D attempts to draw more current from $V_{SUPPLY}$ 115 than it should be drawing if that particular power driver was sharing the current load equally with the other power drivers, hysteretic comparator 103 is caused to cut short the cycle of the power driver that is enabled at that particular time. Therefore, counter 131 is advanced and the next power driver is prepared to supply power to the load. Thus, all of the power drivers 107A, 107B, 107C and 107D are forced to share the current load equally in accordance with the teachings of the present invention.

Figure 3:
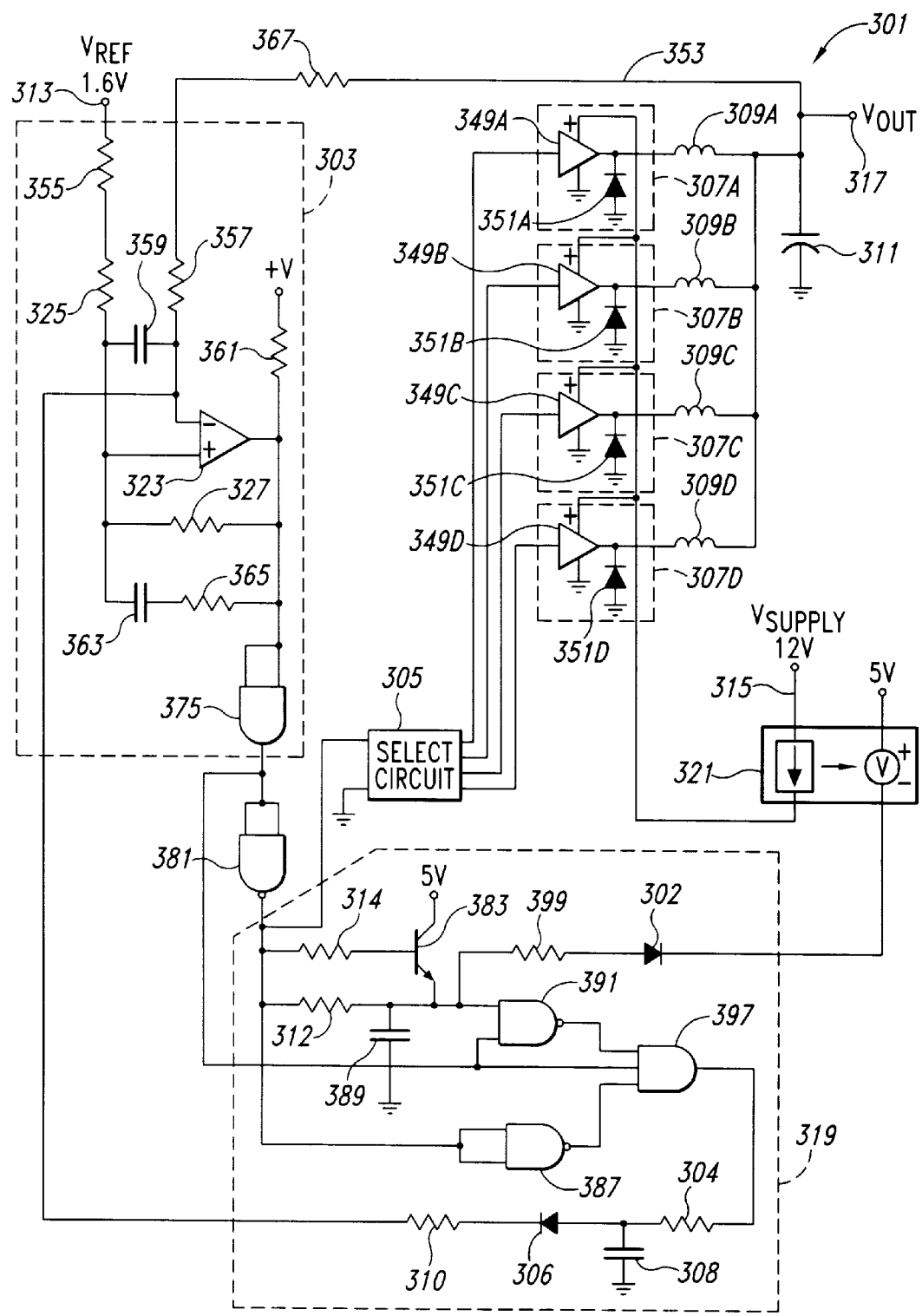
FIG. 3 is a schematic illustrating one embodiment of a power supply in accordance with the teachings of the present invention

FIG. 3 is a schematic illustrating one embodiment of a power supply 301, which corresponds to power supply 101, in accordance with teachings of the present invention. As shown, a plurality of power drivers 307A, 307B, 307C and 307D are coupled to supply power to power supply output 317. In the embodiment depicted, each of the power drivers 307A, 307B, 307C and 307D include a driver and a rectifying element. For instance, power driver 307A includes driver 349A and a rectifying element 351A coupled to the output of driver 349A. In one embodiment, rectifying element 351A does not conduct when driver 349A is enabled and rectifying element 351A conducts when driver 349A is disabled. In one embodiment, rectifying element 351A is a diode. In another embodiment, rectifying element 351A may be a transistor or the like. As illustrated in FIG. 3, power drivers 307B, 307C and 307D have similar configurations.

In one embodiment, the output voltage $V_{OUT}$ at power supply output 317 is filtered with a capacitor 311 coupled between power supply output 317 and ground. As illustrated in the depicted embodiment, power driver 307A supplies power to power supply output 317 through energy transfer element 309A. Similarly, power drivers 307B, 307C and 307D supply power to power supply output 317 energy transfer elements 309B, 309C and 309D, respectively. In one embodiment, energy transfer elements 309A, 309B, 309C and 309D are inductors.

As shown in the depicted embodiment, power drivers 307A, 307B, 307C and 307D are cyclically enabled by select circuit 305 in accordance with teachings of the present invention. In addition, power drivers 307A, 307B, 307C and 307D are coupled to receive power from supply voltage $V_{SUPPLY}$ 315 through supply current sensor 321. In one embodiment, $V_{SUPPLY}$ 315 is 12 volts. In one embodiment, supply current sensor 321 is also coupled to a 5 volt source to help generate a voltage, which is coupled to be received by a diode 302.

In one embodiment, hysteretic comparator 303 is coupled to clock or advance select circuit 305. As shown in the depicted embodiment, hysteretic comparator 303 includes a comparator 323 coupled to receive feedback 353 from power supply output 317 through resistors 367 and 357. In addition, comparator 323 is coupled to receive a reference voltage $V_{REF}$ 313 through resistors 355 and 325. In one embodiment, $V_{REF}$ 313 is 1.6 volts. In one embodiment, a resistor 327 is coupled between an output of comparator 323 and the input of comparator 323 coupled to receive $V_{REF}$ 313. In addition, capacitor 363 and resistor 365 are coupled between the output of comparator 323 and the input of comparator 323 coupled to receive $V_{REF}$ 313 in one embodiment. In one embodiment, the output of comparator 323 is coupled to a positive rail through resistor 361. In one embodiment, the two inputs of comparator 323 are capacitively coupled through capacitor 359. In one embodiment, the output of comparator 323 is driven through AND gate 375 and is then coupled to be received by both inputs of a NAND gate 381, whose output is used to clock or advance select circuit 305.

In one embodiment, the output of hysteretic comparator 303 is also coupled to be received by reset circuit 319 through the output of NAND gate 381. In particular, reset circuit 319 includes NAND gate 387 having both inputs coupled to receive the output of NAND gate 381. In addition, an input of a NAND gate 391 is coupled to the output of NAND gate 381 through resistor 312. The other input of NAND gate 391 is coupled to the output of AND gate 375. AND gate 397 is coupled to receive one input from the output of NAND gate 391, one input from the output of NAND gate 387 and one input from the output of AND gate 375.

As shown in FIG. 3, reset circuit 319 also includes a capacitor 389, which is coupled to resistor 312, one of the inputs of NAND gate 391 and coupled to supply current sensor 321 through resistor 399 and diode 302. Reset circuit 319 also includes a transistor 383 which is coupled to charge capacitor 389 to 5 volts in response to the output of NAND gate 381 through resistor 314. In particular, as shown in the depicted embodiment, capacitor 389 is charged through transistor 383 when a high signal is generated by the output of NAND gate 381 in response to hysteretic comparator 303. When the output of NAND gate 381 is a low signal, transistor 383 is switched off and capacitor 389 is discharged. If capacitor 389 is given enough time to discharge below the input threshold level of NAND gate 391, the output of NAND gate 391 switches high, which results in the output of AND gate 397 switching high. The high signal generated at the output of AND gate 397 is received by hysteretic comparator 303 through resistor 304, diode 306 and resistor 310 to the input of comparator 323 coupled to receive feedback 353. Therefore, if hysteretic comparator 303 does not switch before capacitor 389 discharges, reset circuit 319 forces hysteretic comparator 303 to switch. In particular, the high signal generated at the output of AND gate 397 forces comparator 323 to receive a high signal on feedback 353.

As shown in the embodiment of FIG. 3, the amount of time required to discharge capacitor 389 is adjusted in response to supply current sensor 321. In particular, supply current sensor 321 generates a voltage in response to the amount of current drawn by power drivers 307A, 307B, 307C and 307D. In one embodiment, as the amount of current drawn by power drivers 307A, 307B, 307C and 307D increases, the voltage output by supply current sensor 321 decreases. As result, capacitor 389 discharges faster through resistor 399 and diode 302 as the current drawn by power drivers 307A, 307B, 307C and 307D increases. Thus, hysteretic comparator 303 is also forced to switch by reset circuit 319 in response to the amount of current supplied to power drivers 307A, 307B, 307C and 307D in accordance with teachings of the present invention. Thus, in one embodiment, reset circuit 319 is a voltage controlled resetable one shot circuit. Therefore, if for some reason the voltage at power supply output 317 does not reach a threshold voltage of hysteretic comparator 303 and the amount of current drawn by power drivers 307A, 307B, 307C and 307D rises, comparator 323 is forced to switch to advance select circuit 305 sooner in accordance with teachings of the present invention.

Figure 4:
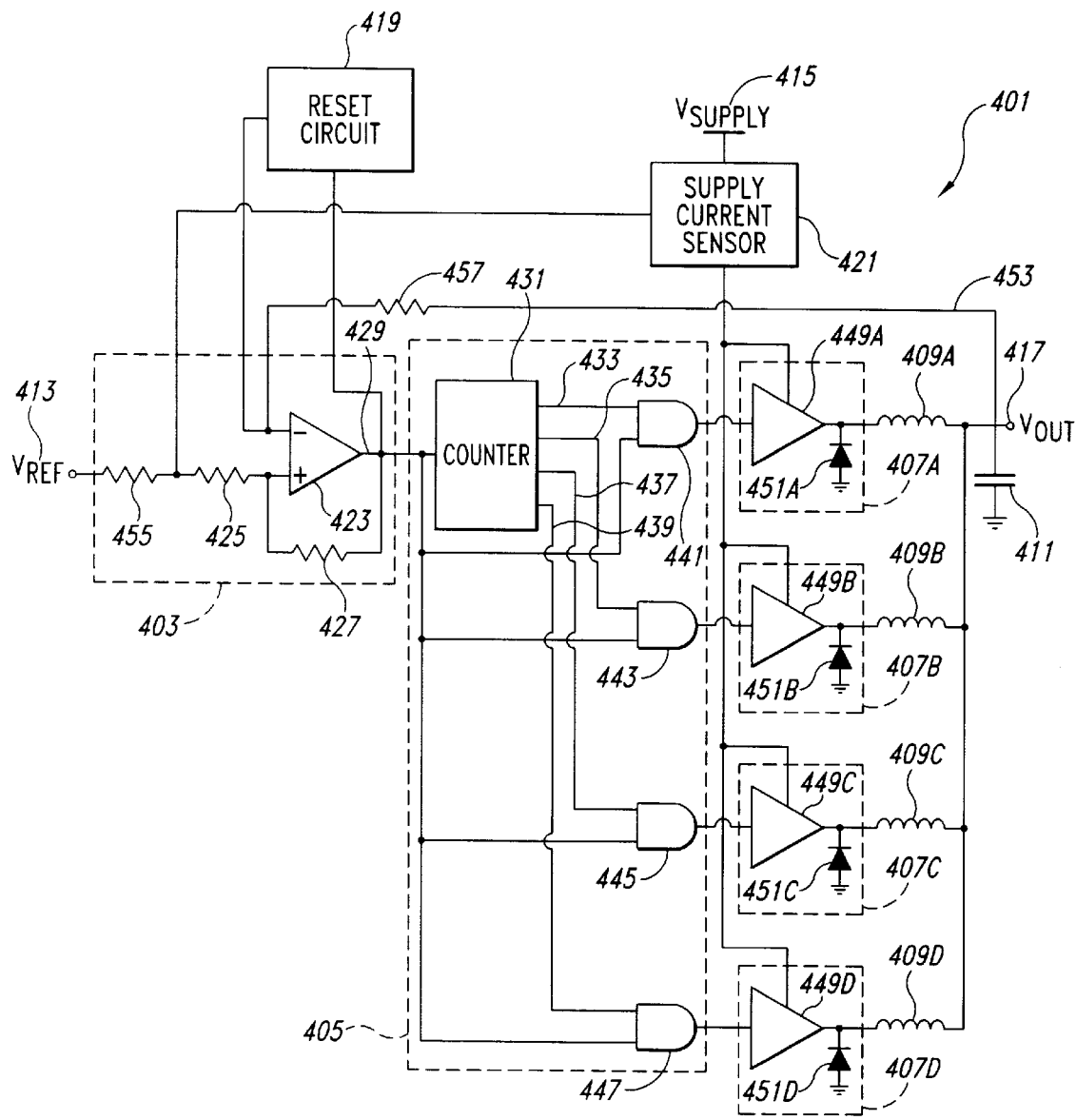
FIG. 4 is a block diagram illustrating another embodiment of a power supply in accordance with the teachings of the present invention.

Another embodiment of the present invention is illustrated in FIG. 4. In particular, FIG. 4 is a block diagram of one embodiment of a power supply 401 including a four phase ripple regulator DC—DC converter with multiphase current sharing in accordance with the teachings of the present invention. It is observed that power supply 401 of FIG. 4 is similar to power supply 101 of FIG. 1 in that power supply 401 includes a plurality of power drivers 407A, 407B, 407C and 407D coupled to supply power to power supply output 417 through energy transfer elements 409A, 409B, 409C and 409D, respectively. In one embodiment, the current load is equally shared or distributed among power drivers 407A, 407B, 407C and 407D. Each of the power drivers 407A, 407B, 407C and 407D include drivers 449A, 449B, 449C and 449D, respectively, and rectifying elements 451A, 451B, 451 C and 451D, respectively. A filter element 411 is coupled to power supply output 417 to filter the output voltage $V_{OUT}$.

In power supply 401, power drivers 407A, 407B, 407C and 407D are cyclically enabled in response to select circuit 405. Select circuit 405 includes counter 431 having outputs 433, 435, 437 and 439 coupled to AND gates 441, 443, 445 and 447, respectively. AND gates 441, 443, 445 and 447 are each respectively coupled to receive signal 429 from hysteretic comparator 403. Hysteretic comparator 403 provides ripple regulation for power supply 401 as it is coupled to receive feedback 453 from power supply output 417 through a resistor 457. In particular, hysteretic comparator 403 includes comparator 423 having an input coupled to receive feedback 453. The other input of comparator 423 is coupled to reference voltage $V_{REF}$ 413 through a resistor 425 and a resistor 455. The output of comparator 423 is coupled to a resistor 427, which is coupled to the input of comparator 423 that is coupled to resistor 425. Resistors 425 and 427 provide hysteresis to comparator 423 such that the output voltage $V_{OUT}$ at power supply output 417 is ripple regulated between the lower and upper thresholds as determined by $V_{REF}$ 413 and resistors 425 and 427.

In one embodiment, reset circuit 419 is coupled to receive signal 429. In one embodiment, if signal 429 has not switched within a particular time duration, reset circuit is coupled to the input of comparator 423 that is coupled to receive feedback 453 to force comparator 423 to switch. In one embodiment, reset circuit 419 is a resetable one shot circuit.

In one embodiment, power drivers 407A, 407B, 407C and 407D are coupled to receive power from supply voltage $V_{SUPPLY}$ 415 through supply current sensor 421. In one embodiment, supply current sensor 421 monitors the amount of current drawn by power drivers 407A, 407B, 407C and 407D and generates an output voltage that is coupled to be received by resistor 425. As a result, the voltage output by supply current sensor 421 in response to the current drawn by power drivers 407A, 407B, 407C and 407D, in effect, adjusts the reference voltage $V_{REF}$ 413 that is received by comparator 423 through resistor 425. In one embodiment, as the amount of current drawn by power drivers 407A, 407B, 407C and 407D rises, the reference voltage $V_{REF}$ 413 that is received by comparator 423 through resistor 425 is adjusted downward to force comparator 423 to switch at a lower level, thereby shortening the on cycle time for that phase. For example, if the voltage $V_{OUT}$ monitored through the feedback 453 does not rise to a threshold voltage to switch comparator 423 under normal circumstances, the amount of current drawn by power drivers 407A, 407B, 407C and 407D will increase. As a result, the reference voltage $V_{REF}$ 413 received by comparator 423 is adjusted downward, per phase, by supply current sensor 421 such that the output voltage will reach a threshold voltage of comparator 423 sooner, thus causing the output of comparator 423 to switch sooner. It is noted that the current drawn through supply sensor 421 only adjusts the reference voltage $V_{REF}$ 413 received by comparator 423 enough to force current sharing among each of the power drivers 407A, 407B, 407C and 407D. Accordingly, hysteretic comparator 403 is caused to cut short the cycle of the power driver that is enabled at that particular time. Therefore, the next power driver is enabled to supply power to the load and all of the power drivers 407A, 407B, 407C and 407D are forced to share the load equally in accordance with the teachings of the present invention.

Figure 5:
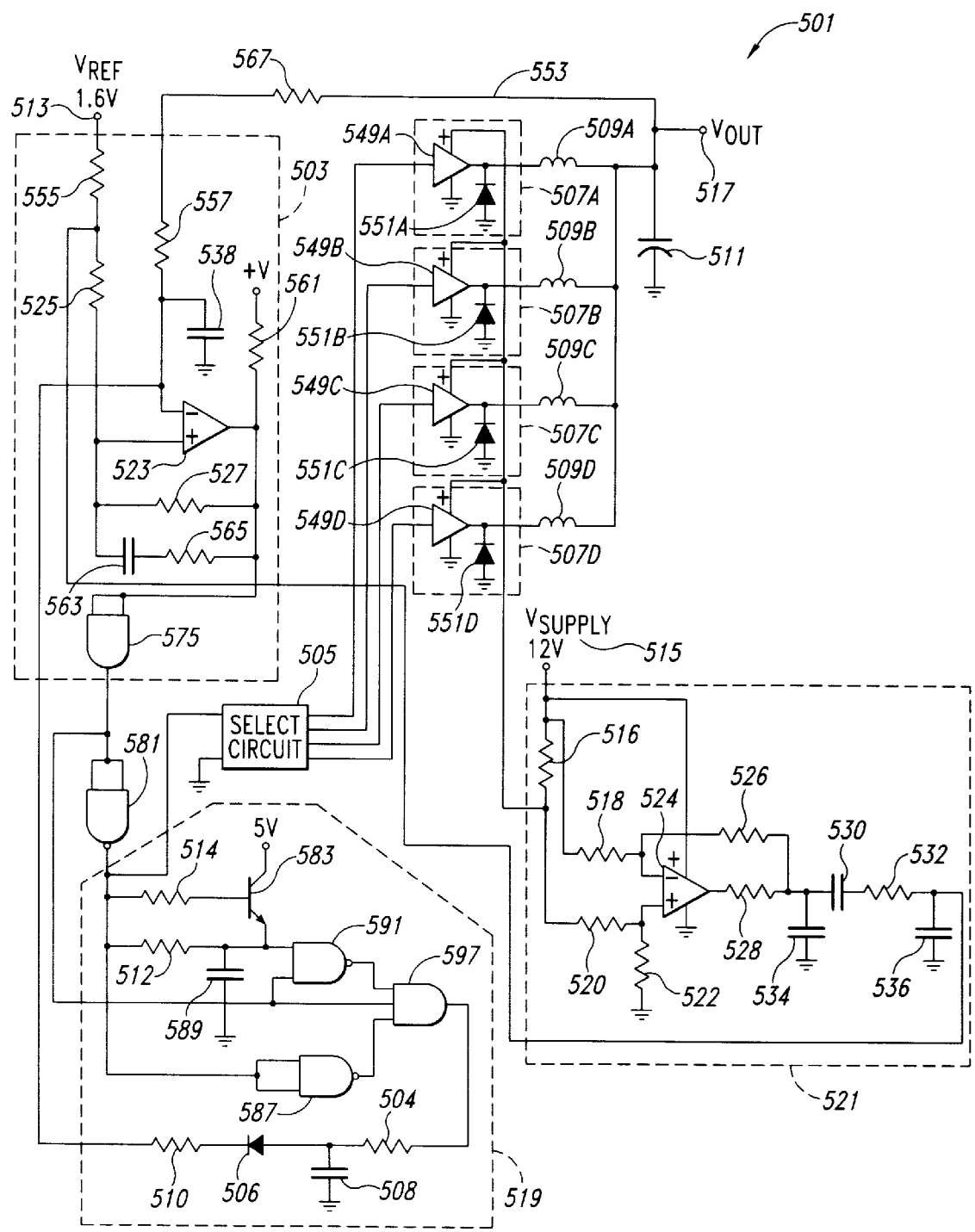
FIG. 5 is a schematic illustrating another embodiment of a power supply in accordance with the teachings of the present invention

FIG. 5 is a schematic illustrating one embodiment of power supply 501, which corresponds to power supply 401, in accordance with teachings of the present invention. As shown, a plurality of power drivers 507A, 507B, 507C and 507D are coupled to supply power to power supply output 517. In the embodiment depicted, each of the power drivers 507A, 507B, 507C and 507D include a driver and a rectifying element. For instance, power driver 507A includes driver 549A and a rectifying element 551A coupled to the output of driver 549A. In one embodiment, rectifying element 551A does not conduct when driver 549A is enabled and rectifying element 551A conducts when driver 549A is disabled. In one embodiment, rectifying element 551A is a diode. In another embodiment, rectifying element 551A may be a transistor or the like. As illustrated in FIG. 5, power drivers 507B, 507C and 507D have similar configurations.

In one embodiment, the output voltage $V_{OUT}$ at power supply output 517 is filtered with a capacitor 511 coupled between power supply output 517 and ground. As illustrated in the depicted embodiment, power driver 507A supplies power to power supply output 517 through energy transfer element 509A. Similarly, power drivers 507B, 507C and 507D supply power to power supply output 517 through energy transfer elements 509B, 509C and 509D, respectively. In one embodiment, energy transfer elements 509A, 509B, 509C and 509D are inductors.

As shown in the depicted embodiment, power drivers 507A, 507B, 507C and 507D are cyclically enabled by select circuit 505 in accordance with teachings of the present invention. In addition, power drivers 507A, 507B, 507C and 507D are coupled to receive power from supply voltage $V_{SUPPLY}$ 515 through supply current sensor 521. In one embodiment, $V_{SUPPLY}$ 515 is 12 volts.

In one embodiment, hysteretic comparator 503 is coupled to clock or advance select circuit 505. As shown in the depicted embodiment, hysteretic comparator 503 includes a comparator 523 coupled to receive feedback 553 from power supply output 517 through resistors 567 and 557. In addition, comparator 523 is coupled to receive a reference voltage $V_{REF}$ 513 through resistors 555 and 525. In one embodiment, $V_{REF}$ 513 is 1.6 volts. In one embodiment, a resistor 527 is coupled between an output of comparator 523 and the input of comparator 523 coupled to receive $V_{EF}$ 513. In addition, capacitor 563 and resistor 565 are coupled between the output of comparator 523 and the input of comparator 523 coupled to receive $V_{REF}$ 513 in one embodiment. In one embodiment, the output of comparator 523 is coupled to a positive rail through resistor 561. In one embodiment, the input of comparator 523 coupled to receive feedback 553 is capacitively coupled to ground through capacitor 538. In one embodiment, the output of comparator 523 is driven through AND gate 575 and is then coupled to be received by both inputs of a NAND gate 581, whose output is used to clock or advance select circuit 505.

In one embodiment, the output of hysteretic comparator 503 is also coupled to be received by reset circuit 519 through the output of NAND gate 581. In particular, reset circuit 519 includes NAND gate 587 having both inputs coupled to receive the output of NAND gate 581. In addition, NAND gate 591 is coupled to the output of NAND gate 581 through resistor 512. The other input of NAND gate 591 is coupled to the output of AND gate 575. AND gate 597 is coupled to receive one input from the output of NAND gate 591, one input from the output of NAND gate 587 and one input from the output of AND gate 575.

As shown in FIG. 5, reset circuit 519 also includes a capacitor 589, which is coupled to resistor 512 and one of the inputs of NAND gate 591. Reset circuit 519 also includes a transistor 583 which is coupled to charge capacitor 589 to 5 volts in response to the output of NAND gate 581 through resistor 514. In particular, as shown in the depicted embodiment, capacitor 589 is charged through transistor 583 when a high signal is generated by the output of NAND gate 581 in response to hysteretic comparator 503. When the output of NAND gate 581 is a low signal, transistor 583 is switched off and capacitor 589 is discharged. If capacitor 589 is given enough time to discharge below the input threshold level of NAND gate 591, the output of NAND gate 591 switches high, which results in the output of AND gate 597 switching high. The high signal generated at the output of AND gate 597 is received by hysteretic comparator 503 through resistor 504, diode 506 and resistor 510 to the input of comparator 523 coupled to receive feedback 553. Therefore, if hysteretic comparator 503 does not switch before capacitor 589 discharges, reset circuit 519 forces hysteretic comparator 503 to switch. In particular, the high signal generated at the output of AND gate 597 forces comparator 523 to receive a high signal on feedback 553.

As shown in the embodiment of FIG. 5, the reference voltage $V_{REF}$ 513 received by comparator 523 is adjusted in response to supply current sensor 521. In particular, supply current sensor 521 generates a voltage in response to the amount of current drawn by power drivers 507A, 507B, 507C and 507D. As shown in the depicted embodiment, power drivers 507A, 507B, 507C and 507D receive power from supply voltage $V_{SUPPLY}$ 515 through a current sense resistor 516. The voltage drop across current sense resistor 516 is amplified by amplifier 524. In particular, the voltage at one end of current sense resistor 516 is coupled to be received by one input of amplifier 524 through resistor 518. The voltage at the other end of current sense resistor 516 is coupled to be received by the other input of amplifier 524 through resistor 520. In one embodiment, this input of amplifier 524 is also coupled to ground through resistor 522. In one embodiment, the output of amplifier 524 is coupled to the input of amplifier 524 that is coupled to resistor 518 through resistor 526. In one embodiment, a resistor-capacitor network including resistors 528 and 532 and capacitors 530, 534 and 536 are coupled to the output of amplifier 524. In one embodiment, the output of amplifier 524 is alternating current (AC) coupled to the input of comparator 523 coupled to receive the reference voltage $V_{REF}$ 513 through resistor 525. With this AC coupling between current supply sensor 521 and comparator 523, the output voltage $V_{OUT}$ at power supply output 517 is not caused to droop in accordance with the teachings of one embodiment of the present invention.

Therefore, in one embodiment, as the amount of current drawn by power drivers 507A, 507B, 507C and 507D increases, the voltage drop across current sense resistor 516 increases accordingly. This voltage drop across current sense resistor 516 is amplified with amplifier 524, whose output is AC coupled to, in effect, adjust the reference voltage $V_{REF}$ 513 received by comparator 523. The reference voltage $V_{REF}$ 513 coupled to be received by comparator 523 is adjusted downward to such a degree such that hysteretic comparator 503 is also forced to switch in a shorter time in response to the amount of current supplied to power drivers 507A, 507B, 507C and 507D in accordance with teachings of the present invention. Thus, if for some reason the voltage at power supply output 517 does not reach a threshold voltage of hysteretic comparator 503 and the amount of current drawn by power drivers 507A, 507B, 507C and 507D rises, comparator 523 is forced to switch in accordance with teachings of the present invention. It is noted that the current drawn through supply current sensor 521 only modifies the reference voltage $V_{REF}$ 513 received by comparator 523 enough to force current sharing among each of the power drivers 507A, 507B, 507C and 507D.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A power supply, comprising:
   a supply current sensor coupled to a supply voltage;
   a plurality of power driver circuits, each one of the power driver circuits coupled to receive power through the supply current sensor;
   a plurality of energy transfer elements, each one of the energy transfer elements coupled to receive power from a corresponding one of the power driver circuits and coupled to deliver power to an output of the power supply;

a select circuit coupled each one of the power driver circuits; and a hysteretic comparator coupled to the output of the power supply, coupled to the supply current sensor and coupled to the select circuit, the select circuit coupled to select at least one of the power driver circuits in response to the output of the power supply and in response to the supply current sensor.

2. The power supply of claim 1 wherein each one of the energy transfer elements comprises an inductor.

3. The power supply of claim 1 further comprising a filter element coupled to the output of the power supply.

4. The power supply of claim 3 wherein the filter element comprises a capacitor.

5. The power supply of claim 1 further comprising a reset circuit coupled between the supply current sensor and the hysteretic comparator, the reset circuit coupled to reset the hysteretic comparator in response to the supply current sensor.

6. The power supply of claim 5 wherein the reset circuit is coupled to an input of the hysteretic comparator that is coupled to the output of the power supply.

7. The power supply of claim 5 wherein the reset circuit comprises a voltage controlled resetable one shot circuit, the one shot circuit coupled to be reset in response to the hysteretic comparator, the one shot circuit coupled to be voltage controlled in response to the supply current sensor.

8. The power supply of claim 1 wherein the hysteretic comparator is coupled to a reference voltage an input of the hysteretic comparator coupled to the output of the power supply, the hysteretic comparator coupled to switch in response to the output of the power supply and the reference voltage.

9. The power supply of claim 8 further comprising a reset circuit coupled to an input of the hysteretic comparator that is coupled to the reference voltage, the reset circuit coupled to reset the hysteretic comparator in response to an output of the hysteretic comparator.

10. The power supply of claim 9 wherein the reset circuit comprises a resetable one shot circuit, the one shot circuit coupled to be reset in response to the hysteretic comparator.

11. The power supply of claim 1 wherein the select circuit comprises:
a counter coupled to an output of the hysteretic comparator; and
a plurality of AND gates, each one of the AND gates having an output coupled to select a corresponding one of the power driver circuits, each one of the AND gates having an input coupled to a corresponding one of a plurality of outputs of the counter and an output coupled to the output of the hysteretic comparator.

12. The power supply of claim 1 wherein each one of the power driver circuits comprises:
a driver element coupled to receive power through the current supply sensor, the driver element coupled to be enabled by the select circuit; and
a rectifying element coupled to an output of the driver element, the rectifying element to coupled to supply current when the driver element is disabled, the rectifying element coupled not to supply current when the driver element is enabled.

13. The power supply of claim 12 wherein the rectifying element comprises a diode.

14. A method of supplying power, comprising:
ripple regulating a power supply by monitoring an output of the power supply through a hysteretic comparator;
current sharing in the power supply by cyclically enabling in response to the hysteretic comparator each one of a plurality of power driver circuits coupled to the output of the power supply;
monitoring a current supplied to the plurality of power driver circuits; and
cyclically enabling a next one of the plurality of power driver circuits in response to the current supplied to the plurality of power driver circuits.

15. The method of supplying power of claim 14 wherein cyclically enabling the next one of the plurality of power driver circuits in response to the current supplied to the plurality of power driver circuits comprises adjusting an input of the hysteretic comparator coupled to monitor the output of the power supply.

16. The method of supplying power of claim 14 wherein cyclically enabling the next one of the plurality of power driver circuits in response to the current supplied to the plurality of power driver circuits comprises adjusting an input of the hysteretic comparator coupled to receive a reference voltage.

17. The method of supplying power of claim 14 wherein current sharing in the power supply comprises summing currents generated by each one of the plurality of circuits.

18. The method of supplying power of claim 14 further comprising filtering the output of the power supply.

19. The method of supplying power of claim 14 further comprising resetting the hysteretic comparator with a one shot circuit in response to an output of the hysteretic comparator.

20. The method of supplying power of claim 19 wherein the one shot circuit is coupled to reset the hysteretic comparator in response to a time duration elapsed from a last time the one shot circuit is reset in response to the output of the hysteretic comparator.

21. The method of supplying power of claim 14 wherein current sharing in the power supply by cyclically enabling in response to the hysteretic comparator each one of the plurality of power driver circuits comprises:
cycling through a plurality of outputs of a counter in response to an output of the hysteretic comparator; and
enabling one of the plurality of power driver circuits in response to an active signal on the output of the hysteretic comparator and an active signal on one of the plurality of outputs of the counter.

22. The method of supplying power of claim 14 wherein monitoring the current supplied to the plurality of power driver circuits comprises generating a sense voltage in response to the current supplied to the plurality of power driver circuits.

23. A DC—DC converter, comprising:
a plurality of power driver circuits coupled to deliver power to an output of the DC—DC converter;
a supply current sensor coupled to a supply voltage, each one of the power driver circuits coupled to receive power through the supply current sensor; and
a select circuit coupled to cyclically enable each one of the power driver circuits in sequence in response to feedback from the output of the DC—DC converter and in response to current supplied to the power driver circuits.

24. The DC—DC converter of claim 23 further comprising a hysteretic comparator coupled to the select circuit and coupled to receive the feedback from the output of the DC—DC converter, the hysteretic converter coupled to switch the select circuit in response to the feedback from the output of the DC—DC converter.

25. The DC—DC converter of claim 24 further comprising a reset circuit coupled an input and an output of the hysteretic comparator, the reset circuit coupled to cause the hysteretic comparator to switch in response the output of the hysteretic comparator.

26. The DC—DC converter of claim 25 wherein the reset circuit is further coupled to the supply current sensor, the reset circuit further coupled to cause the hysteretic comparator to switch in response to the current supplied to the power driver circuits.

27. The DC—DC converter of claim 24 wherein the hysteretic comparator is coupled to receive a reference voltage, wherein the supply current sensor is coupled to the hysteretic comparator at an input of the hysteretic comparator coupled to receive the reference voltage.

28. The DC—DC converter of claim 23 further comprising a plurality of energy transfer elements, each one of the energy transfer elements coupled between the output of the DC—DC converter and a corresponding one of the power driver circuits.

29. The DC—DC converter of claim 28 wherein each one of the energy transfer elements comprises an inductor.

30. The DC—DC converter of claim 23 further comprising a filter element coupled to the output of the DC—DC converter.

* * * * *